(12) United States Patent
Wang

(10) Patent No.: US 10,491,035 B2
(45) Date of Patent: Nov. 26, 2019

(54) BACKUP POWER SUPPLY SYSTEM

(71) Applicants: Inventec (Pudong) Technology Corporation, Shanghai (CN); INVENTEC CORPORATION, Taipei (TW)

(72) Inventor: Shu-Yen Wang, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 486 days.

(21) Appl. No.: 15/470,435

(22) Filed: Mar. 27, 2017

(65) Prior Publication Data
US 2018/0138739 A1 May 17, 2018

(30) Foreign Application Priority Data
Nov. 14, 2016 (CN) .......................... 2016 1 1023817

(51) Int. Cl.
*H02J 9/06* (2006.01)
(52) U.S. Cl.
CPC ................................. *H02J 9/061* (2013.01)
(58) Field of Classification Search
CPC ................ H02J 9/061; H02J 9/04; G06F 1/26
See application file for complete search history.

(56) References Cited

U.S. PATENT DOCUMENTS

| | | | |
|---|---|---|---|
| 4,673,825 A * | 6/1987 | Raddi | H02J 9/062 307/66 |
| 2006/0043792 A1* | 3/2006 | Hjort | H02J 9/062 307/1 |
| 2011/0022858 A1* | 1/2011 | Chen | G06F 1/20 713/300 |
| 2013/0264879 A1* | 10/2013 | Shih | H02J 9/005 307/66 |

\* cited by examiner

*Primary Examiner* — Rexford N Barnie
*Assistant Examiner* — Thai H Tran
(74) *Attorney, Agent, or Firm* — Muncy, Geissler, Olds & Lowe, P.C.

(57) ABSTRACT

A backup power supply system is provided in the present invention. In the backup power supply system, a power supply module is provided to transmit a work electricity to a load module. When a trigger is triggered to be switched on, a backup power module transmits a backup power to a capacitor and the load module through a switch module to make the capacitor store the backup power as a storing power. The load module is provided to receive the at least one of the backup power and the storing power to maintain a working status. The power supply module stops transmitting the work electricity to the load module when the backup power supply system is at a backup status.

10 Claims, 2 Drawing Sheets

BACKUP POWER SUPPLY SYSTEM

This application claims the benefit of China Patent Application Serial No. 201611023817.6, filed Nov. 14, 2016, the subject matter of which is incorporated herein by reference.

BACKGROUND OF INVENTION

1. Field of the Invention

The present invention is related to a backup power supply system, and more particularly is related to a backup power supply system having a trigger which can be switched on to have a backup power module providing a backup power to a load module.

2. Description of the Prior Art

Attending with the progress of technology, network has played an indispensable role in our daily lives, and people are used to work with personal computers such as desktops or notebooks, or even handle multinational e-business through the network. A server is an important apparatus for the construction of network, and thus are widely used in the server room of the industries of internet service provider (ISP).

In general, a server includes a large amount of hard disk drives (HDDs), complex programmable logic devices (CPLDs), and indicator lights, wherein each HDD has a corresponding indicator light which is controlled by the CPLD. When the HDD fails, the server should be powered off first such that the repair technician may check the damage of the HDDs. However, when the server is powered off, the repair technician cannot determine which HDD is the failed one immediately because the indicator light cannot illuminate. Therefore, how to provide a backup power to maintain the normal operation of the load module, such as CPLD, when the server is powered off is a target to be improved in the business.

SUMMARY OF THE INVENTION

In view of the afore mentioned conventional server, it is common to have the problem of unable to provide the backup power effectively to facilitate the repair operation of the hard disk drive. Accordingly, it is a main object of the present invention to provide a backup power supply system, which has the backup power module and the trigger, and the trigger would be triggered to have the backup power module providing the backup power when it is necessary to do the repair operation. Thus, the backup power supply system provided in accordance with the present invention can resolve the issues about the backup power of the conventional internet of thing (IoT) architecture effectively.

In accordance with the aforementioned object, a backup power supply system is provided. The backup power supply system comprises a backup power module, a trigger, a switch module, a capacitor, a load module, a power supply module, a first switch, and a second switch. The backup power module is utilized for providing a backup power in a backup status. The trigger is electrically connected to the backup power module. The switch module is electrically connected to the backup power module and the trigger for switching from a first cutoff state to a first conductive state when the trigger is triggered to be turned on, so as to have the backup power module transmitting the backup power to the switch module. The capacitor has a first capacitor terminal and a second capacitor terminal. The first capacitor terminal is electrically connected to the switch module and the second capacitor terminal is grounded. The capacitor is utilized for storing the backup power as a stored power in the first conductive state. The load module is electrically connected to the switch module and the capacitor for receiving at least one of the backup power and the stored power in the first conductive state to have the load module staying in a working state. The power supply module is electrically connected to the load module for transmitting a work power to the load module in a work status to have the load module staying in the working state. The first switch is electrically connected to the power supply module. The first switch stays in a second conductive state in the work status and stays in a second cutoff state in the backup status to have the power supply module stop transmitting the work power to the load module. The second switch is electrically connected to the trigger, the first switch, and the first capacitor terminal. The second switch stays in a third cutoff state in the work status and stays in a third conductive state in the backup status.

In accordance with an embodiment of the present invention, the backup power module comprises a backup power source and a first resistor. The first resistor has a first resistor terminal electrically connected to the backup power source and has a second resistor terminal electrically connected to the trigger and the switch module for preventing leakage of the backup power in the work status, and the backup power source may be a supercapacitor. In addition, the first switch is a first N-type metal-oxide-semiconductor field-effect transistor (MOSFET), the second switch is a second N-type MOSFET, a source of the first N-type MOSFET is grounded, a drain of the first N-type MOSFET is electrically connected to the first capacitor terminal, a gate of the first N-type MOSFET is electrically connected to the power supply module; a gate of the second N-type MOSFET is electrically connected to the first capacitor terminal and the drain of the first N-type MOSFET, a source of the second N-type MOSFET is grounded, and a drain of the second N-type MOSFET is electrically connected to the trigger, the switch module, and the second resistor terminal of the first resistor.

In accordance with an embodiment of the present invention, the switch module comprises a first P-type MOSFET, a second P-type MOSFET, and a second resistor. A drain of the first P-type MOSFET is electrically connected to the backup power module, and a gate of the first P-type MOSFET is electrically connected to the trigger, the drain of the second N-type MOSFET, and the second resistor terminal of the first resistor. A drain of the second P-type MOSFET is electrically connected to a source of the first P-type MOSFET, and a gate of the second P-type MOSFET is electrically connected to the trigger, the drain of the second N-type MOSFET, the second resistor terminal of the first resistor, and the gate of the first P-type MOSFET. One terminal of the second resistor is grounded, and another terminal of the second resistor is electrically connected to a drain of the second P-type MOSFET and the first capacitor terminal. In addition, resistance of the first resistor and the second resistor is greater than 1M ohms.

In accordance with an embodiment of the present invention, the backup power supply system further comprises a third switch, which is electrically connected to the load module and the first capacitor terminal, for changing the second switch to the third cutoff state when the load module is triggered to be switched from a fourth cutoff state to a fourth conductive state, so as to switch the switch module from the first conductive state to the first cutoff state to have the backup power module stop providing the backup power and to have the capacitor discharging the stored power to the third switch. In addition, the third switch is a third N-type MOSFET. A gate of the third N-type MOSFET is electrically connected to the load module, a source of the third N-type MOSFET is grounded, and a drain of the third N-type MOSFET is electrically connected to the first switch and the first capacitor terminal In accordance with an embodiment of the present invention, the load module comprises a complex programmable logic device (CPLD) and a plurality of indicator lights. The CPLD is electrically connected to the switch module and the first capacitor terminal, for receiving the work power in the work status and for receiving at least one of the backup power and the stored power in the backup status. These indicator lights are electrically connected to the CPLD such that when the CPLD is powered on, the CPLD may control these indicator lights. In addition, the backup power supply system further comprises a third resistor. A third resistor terminal of the third resistor is electrically connected to the first capacitor terminal, and a fourth resistor terminal of the third resistor is electrically connected to the first switch and the second switch.

As mentioned, by using the backup power supply system provided in accordance with the present invention, if a repair operation is needed, the repair technician only needs to switch the trigger, then the backup power module can be used to provide the backup power to the load module through the switch module, such that the repair operation would be more convenient.

By using the backup power supply system provided in accordance with the embodiments of the present invention, the first resistor with a higher resistance is helpful for preventing the leakage of backup power so as to have the backup power module maintain lossless in the working status before the backup status.

BRIEF DESCRIPTION OF THE DRAWINGS

The present invention will now be specified with reference to its preferred embodiment illustrated in the drawings, in which.

DESCRIPTION OF THE PREFERRED EMBODIMENT

There are various embodiments of the backup power supply system in accordance with the present invention, which are not repeated hereby. Only one preferred embodiment is mentioned in the following paragraph as an example.

Figure 1:
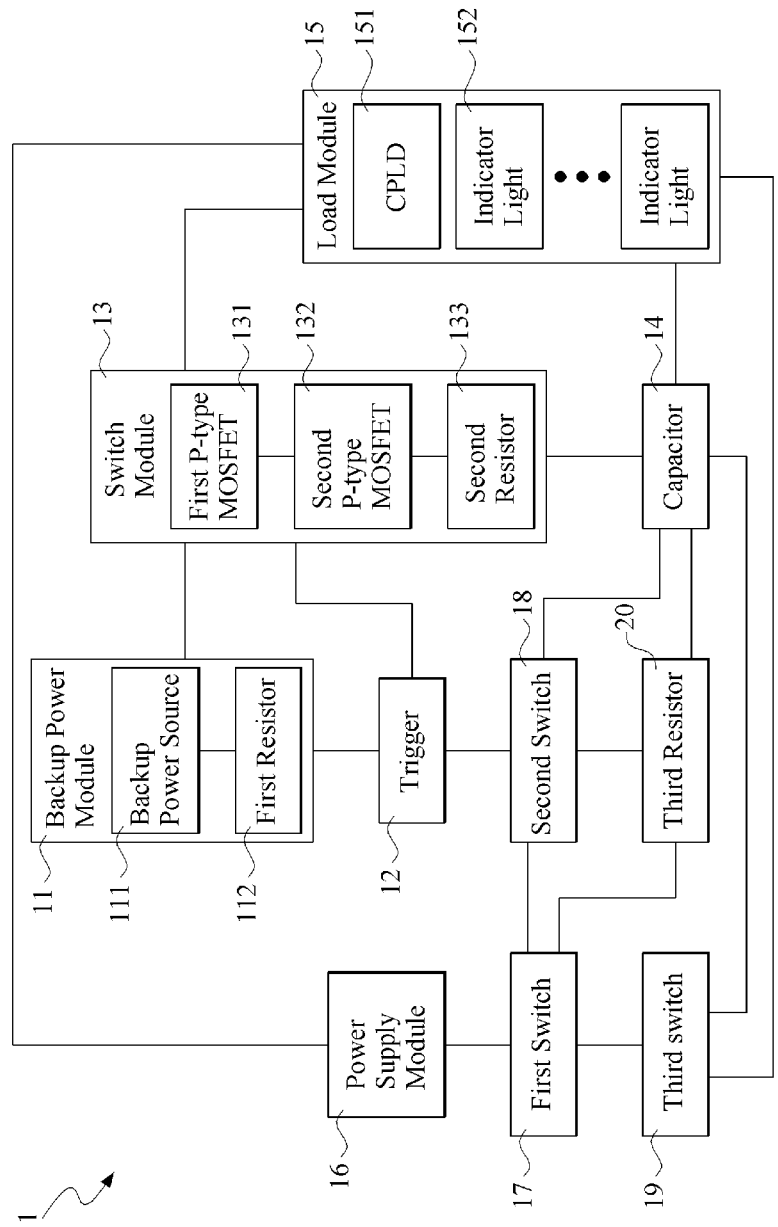
FIG. 1 is a block diagram of the backup power supply system provided in accordance with a preferred embodiment of the present invention.
Figure 2:
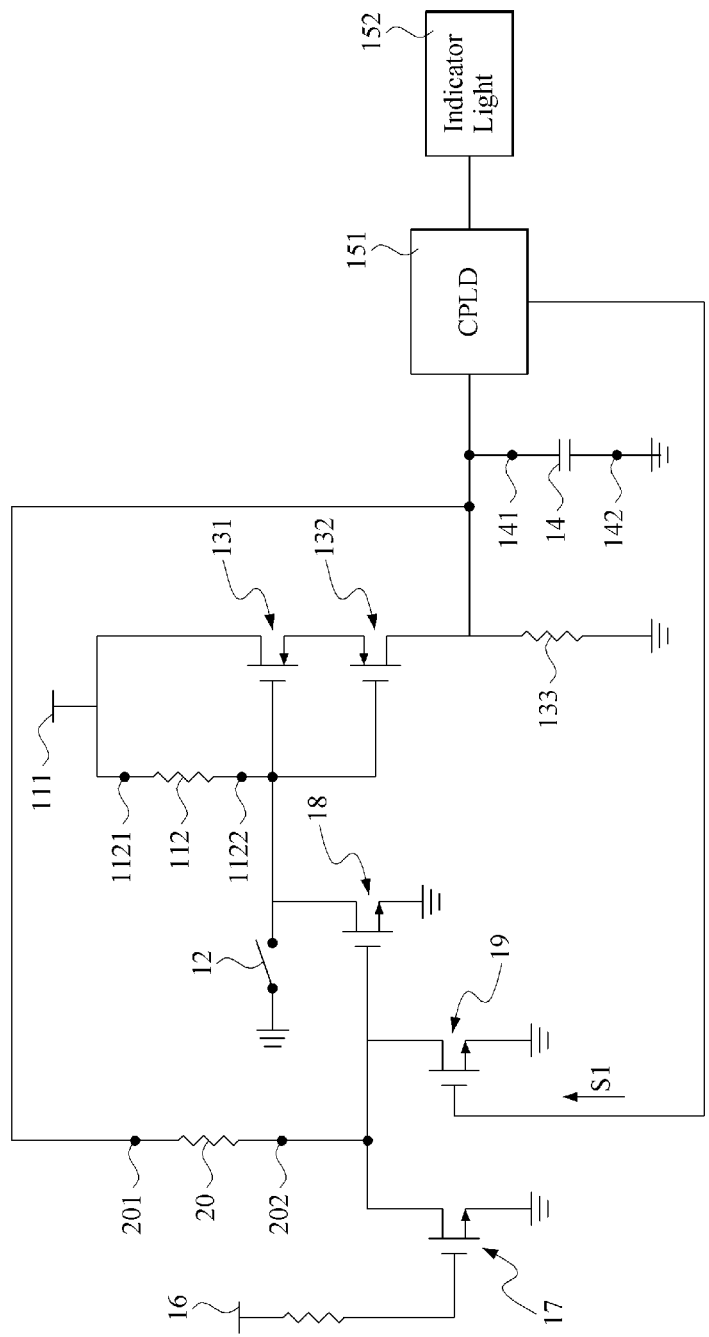
FIG. 2 is a circuit diagram of the backup power supply system in accordance with a preferred embodiment of the present invention.

Please refer to FIG. 1 and FIG. 2, wherein FIG. 1 is a block diagram of the backup power supply system provided in accordance with a preferred embodiment of the present invention and FIG. 2 is a circuit diagram of the backup power supply system in accordance with a preferred embodiment of the present invention.

As shown, the backup power supply system 1 comprises a backup power module 11, a trigger 12, a switch module 13, a capacitor 14, a load module 15, a power supply module 16, a first switch 17, a second switch 18, a third switch 19, and a third resistor 20.

The backup power module 11 comprises a backup power source 111 and a first resistor 112. The backup power source 111 is a supercapacitor, but the present invention is not so restricted. The first resistor 112 has a first resistor terminal 1121 electrically connected to the backup power source 111, and resistance of the first resistor 112 is greater than 1M ohms. The purpose of using a large resistance first resistor 112 is for preventing power leakage of the backup power source 111 when the backup power source 111 is not activated.

The trigger 12 is electrically connected to the backup power module 11. Concretely speaking, the trigger 12 is electrically connected to a second resistor terminal 1122 of the first resistor 112. The trigger 12 can be a trigger button, but the present invention is not so restricted.

The switch module 13 is electrically connected to the backup power module 11 and the trigger 12, wherein the switch module 13 is electrically connected to the second resistor terminal 1122 of the first resistor, and comprises a first P-type MOSFET 131, a second P-type MOSFET 132, and a second resistor 133.

A drain of the first P-type MOSFET 131 is electrically connected to the backup power module 11 (i.e. electrically connected to the backup power source 111), a gate of the first P-type MOSFET 131 is electrically connected to the trigger 12 and the second resistor terminal 1122 of the first resistor 112. A source of the second P-type MOSFET 132 is electrically connected to a source of the first P-type MOSFET 131, a gate of the second P-type MOSFET 132 is electrically connected to the trigger 12, the second resistor terminal 1122, and the gate of the first P-type MOSFET 131. That is, the first P-type MOSFET 131 and the second P-type MOSFET 132 are connected back-to-back to prevent current leakage. One terminal of the second resistor 133 is grounded and the other terminal of the second resistor 133 is electrically connected to the drain of the second P-type MOSFET 132, and resistance of the second resistor 133 is greater than 1 M ohms.

The capacitor 14 has a first capacitor terminal 141 and a second capacitor terminal 142. The first capacitor terminal 141 is electrically connected to the ungrounded terminal of the afore mentioned second resistor 133 of the switch module 13 and the second capacitor terminal 142 is grounded. The capacitance of the capacitor 14 can be 0.1 µF for example, but the present invention is not so restricted.

The load module 15 is electrically connected to the switch module 13 and the capacitor 14. In the preferred embodiment of the present invention, the load module 15 includes a complex programmable logic device (CPLD) 151 and a plurality of indicator lights 152 (only one of them is labelled). The CPLD 151 is electrically connected to the drain of the second P-type MOSFET 132 of the switch module 13, the ungrounded terminal of the second resistor 133, and the first capacitor terminal 141. These indicator lights are electrically connected to the CPLD 151.

The power supply module 16 is electrically connected to the CPLD 151 of the load module 15, and the power supply module 16 can be an existing power supply.

The first switch 17 is electrically connected to the power supply module 16. The first switch 17 is a first N-type MOSFET. A drain of the first N-type MOSFET is electrically connected to the first capacitor terminal 141 of the capacitor 14, a gate of the first N-type MOSFET is electrically connected to the power supply module 16 through a resistor (not labelled in the figure).

The second switch 18 is electrically connected to the trigger 12, the first switch 17, and the first capacitor terminal 141 of the capacitor 14. Concretely speaking, the second switch 18 is a second N-type MOSFET, a gate of the second N-type MOSFET is electrically connected to the first capacitor terminal 141 of the capacitor 14 and the drain of the first N-type MOSFET, a source of the second N-type MOSFET is grounded, and a drain of the second N-type MOSFET is electrically connected to the trigger 12, the gate of the first P-type MOSFET 131 and the gate of the second P-type MOSFET 132 in the switch module 13, and the second resistor terminal 1122 of the first resistor 112.

The third switch 19 is electrically connected to the load module 15 and the first capacitor terminal 141 of the capacitor 14. The third switch 19 is a third N-type MOSFET. A gate of the third N-type MOSFET is electrically connected to the CPLD 151 of the load module 15, a source of the third N-type MOSFET is grounded, and a drain of the third N-type MOSFET is electrically connected to the first switch 17 and the first capacitor terminal 141 of the capacitor 14.

The third resistor 20 has a third resistor terminal 201 electrically connected to the first capacitor terminal 141 of the capacitor 14, and has a fourth resistor terminal 202 electrically connected to the first switch 17 and the second switch 18. Concretely speaking, the fourth resistor terminal 202 is electrically connected to the drain of the first N-type MOSFET, the gate of the second N-type MOSFET, and the drain of the third N-type MOSFET.

In the working status, the first P-type MOSFET 131 and the second P-type MOSFET 132 of the switch module 13 are in a first cutoff state, the first switch 17 stays in a second conductive state, the second switch 18 stays in a third cutoff state, the third switch 19 stays in a fourth cutoff state, the power supply module 16 transmits a work power (not shown) to the CPLD 151 of the load module 15 to power on the CPLD 151 and have the CPLD 151 staying in the working state, such that the CPLD 151 may control the illumination of the indicator lights 152. In addition, in the working status, the first resistor 112 may prevent leakage of backup power from the backup power module 11.

When a repair operation is needed, the repair technician may press the trigger 12 to turn on the trigger 12 (for example, the trigger 12 may be a switch, which would be conducted when being pressed and would be turned off when the pressing is released). At this time, the first P-type MOSFET 131 and the second P-type MOSFET 132 of the switch module 13 are switched from the first cutoff state to a first conductive state, the first switch 17 is changed from the second conductive state to a second cutoff state and stays in the second cutoff state to stop transmitting work power from the power supply module 16 to the load module 15, the second switch 18 is changed from the third cutoff state to a third conductive state and stays in the third conductive state to have the backup power supply system 1 entering a backup status (at this time, the third switch 19 is still in the fourth cutoff state) so as to have the backup power module 11 transmit a backup power (not shown) through the switch module 13 to the capacitor 14 and the load module 15. The backup power would be stored in the capacitor 14 as a stored power. The CPLD 151 of the load module 15 would be powered on by receiving at least one of the backup power and the stored power to maintain the aforementioned working state to control the illumination of these indicator lights 152.

When the repair operation is ended, the repair technician may trigger the CPLD 151 to transmit a high-level signal S1 (such as a digital "1") to have the third switch 19 changed from the forth cutoff state to a fourth conductive state. At this time, the second switch 18 is changed to the third cutoff state, and the first P-type MOSFET 131 and the second P-type MOSFET 132 of the switch module 13 are changed from the first conductive state to the first cutoff state to have the backup power module 11 stop providing backup power and have the capacitor 14 discharging the stored power to the third switch 19. After the discharging, the repair technician may restart the power to have the first switch 17 changed from the second cutoff state to the second conductive state and staying in the second conductive state.

In conclusion, by using the backup power supply system provided in accordance with the present invention, if a repair operation is needed, the repair technician only needs to switch the trigger, then the backup power module can be used to provide the backup power to the load module through the switch module, such that the repair operation would be more convenient. In addition, the first resistor with a higher resistance is helpful for preventing the leakage of backup power so as to have the backup power module maintain lossless in the working status before the backup status.

While the present invention has been particularly shown and described with reference to a preferred embodiment, it will be understood by those skilled in the art that various changes in form and detail may be without departing from the spirit and scope of the present invention.

What is claimed is:

1. A backup power supply system, comprising:
a backup power module, utilized for providing a backup power in a backup status;
a trigger, electrically connected to the backup power module;
a switch module, electrically connected to the backup power module and the trigger, for switching from a first cutoff state to a first conductive state when the trigger is triggered to be turned on, so as to have the backup power module transmitting the backup power to the switch module;
a capacitor, having a first capacitor terminal and a second capacitor terminal, wherein the first capacitor terminal is electrically connected to the switch module and the second capacitor terminal is grounded for storing the backup power as a stored power in the first conductive state;
a load module, electrically connected to the switch module and the capacitor, for receiving at least one of the backup power and the stored power in the first conductive state to maintain a working state;
a power supply module, electrically connected to the load module, for transmitting a work power to the load module in a work status to have the load module staying in the working state;
a first switch, electrically connected to the power supply module, staying in a second conductive state in the work status, and staying in a second cutoff state in the backup status, to have the power supply module stop transmitting the work power to the load module; and
a second switch, electrically connected to the trigger, the first switch, and the first capacitor terminal, staying in a third cutoff state in the work status, and staying in a third conductive state in the backup status.

2. The backup power supply system of claim 1, wherein the backup power module comprises:
a backup power source; and
a first resistor, having a first resistor terminal electrically connected to the backup power source, and a second resistor terminal electrically connected to the trigger and the switch module, for preventing leakage of the backup power in the work status.

3. The backup power supply system of claim 2, wherein the backup power source is a supercapacitor.

4. The backup power supply system of claim 2, wherein the first switch is a first N-type metal-oxide-semiconductor field-effect transistor (MOSFET), the second switch is a second N-type MOSFET, a source of the first N-type MOSFET is grounded, a drain of the first N-type MOSFET is electrically connected to the first capacitor terminal of the capacitor, a gate of the first N-type MOSFET is electrically connected to the power supply module; a gate of the second N-type MOSFET is electrically connected to the first capacitor terminal of the capacitor and the drain of the first N-type MOSFET, a source of the second N-type MOSFET is grounded, and a drain of the second N-type MOSFET is electrically connected to the trigger, the switch module, and the second resistor terminal of the first resistor.

5. The backup power supply system of claim 4, wherein the switch module comprises:
- a first P-type MOSFET, a drain of the first P-type MOSFET being electrically connected to the backup power module, and a gate of the first P-type MOSFET being electrically connected to the trigger, the drain of the second N-type MOSFET, and the second resistor terminal of the first resistor;
- a second P-type MOSFET, a drain of the second P-type MOSFET being electrically connected to a source of the first P-type MOSFET, and a gate of the second P-type MOSFET being electrically connected to the trigger, the drain of the second N-type MOSFET, the second resistor terminal of the first resistor, and the gate of the first P-type MOSFET; and
- a second resistor, one terminal of the second resistor being grounded, and another terminal thereof being electrically connected to a drain of the second P-type MOSFET and the first capacitor terminal of the capacitor.

6. The backup power supply system of claim 5, wherein resistance of the first resistor and the second resistor is greater than 1M ohms.

7. The backup power supply system of claim 1, further comprises a third switch, which is electrically connected to the load module and the first capacitor terminal of the capacitor, for having the second switch changed to the third cutoff state when the load module is triggered to be changed from a fourth cutoff state to a fourth conductive state, so as to switch the switch module from the first conductive state to the first cutoff state to have the backup power module stop providing the backup power and to have the capacitor discharging the stored power to the third switch.

8. The backup power supply system of claim 7, wherein the third switch is a third N-type MOSFET, a gate of the third N-type MOSFET is electrically connected to the load module, a source of the third N-type MOSFET is grounded, and a drain of the third N-type MOSFET is electrically connected to the first switch and the first capacitor terminal of the capacitor.

9. The backup power supply system of claim 1, wherein the load module comprises:
- a complex programmable logic device (CPLD), electrically connected to the switch module and the first capacitor terminal, for receiving the work power in the work status, and for receiving at least one of the backup power and the stored power in the backup status; and
- a plurality of indicator lights, electrically connected to the CPLD, and controlled by the CPLD when the CPLD is powered on.

10. The backup power supply system of claim 1, further comprising a third resistor, wherein a third resistor terminal of the third resistor is electrically connected to the first capacitor terminal of the capacitor, and a fourth resistor terminal of the third resistor is electrically connected to the first switch and the second switch.

* * * * *